(12) United States Patent
Chen et al.

(10) Patent No.: US 11,308,125 B2
(45) Date of Patent: Apr. 19, 2022

(54) STORAGE SYSTEM WITH FAST RECOVERY AND RESUMPTION OF PREVIOUSLY-TERMINATED SYNCHRONOUS REPLICATION

(71) Applicant: EMC IP Holding Company LLC, Hopkinton, MA (US)

(72) Inventors: Xiangping Chen, Sherborn, MA (US); Anton Kucherov, Dudley, MA (US); David Meiri, Somerville, MA (US); Svetlana Kronrod, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 546 days.

(21) Appl. No.: 15/936,694

(22) Filed: Mar. 27, 2018

(65) Prior Publication Data

US 2019/0303490 A1    Oct. 3, 2019

(51) Int. Cl.
*G06F 16/27* (2019.01)
*G06F 11/14* (2006.01)

(52) U.S. Cl.
CPC ........ *G06F 16/275* (2019.01); *G06F 11/1464* (2013.01); *G06F 16/273* (2019.01); *G06F 2201/84* (2013.01)

(58) Field of Classification Search
CPC .. G06F 16/275; G06F 16/273; G06F 11/1464; G06F 2201/84
See application file for complete search history.

(56) References Cited

U.S. PATENT DOCUMENTS

| 7,444,464 B2 | 10/2008 | Urmston et al. |
| 8,095,726 B1 | 1/2012 | O'Connell et al. |
| 8,214,612 B1 | 7/2012 | Natanzon |

(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Mark D Featherstone
*Assistant Examiner* — Ranjit P Doraiswamy
(74) *Attorney, Agent, or Firm* — Ryan, Mason & Lewis, LLP

(57) ABSTRACT

A first storage system in one illustrative embodiment is configured to participate in a replication process with a second storage system. The first storage system detects a replication failure condition or other condition requiring termination of a synchronous replication mode of the replication process, and responsive to the detected condition, captures a snapshot of source data that is subject to replication from the first storage system to the second storage system as part of the replication process. The first storage system terminates the synchronous replication mode of the replication process, initiates an asynchronous replication mode of the replication process, executes an asynchronous-to-synchronous transition cycle scan operation for the replication process utilizing the captured snapshot, and resumes the synchronous replication mode of the replication process responsive to successful completion of the asynchronous-to-synchronous transition cycle scan operation.

20 Claims, 10 Drawing Sheets

(56) References Cited

U.S. PATENT DOCUMENTS

| | | | |
|---|---|---|---|
| 8,806,274 B1* | 8/2014 | Chatterjee | G06F 11/1662 707/684 |
| 9,104,326 B2 | 8/2015 | Frank et al. | |
| 9,208,162 B1 | 12/2015 | Hallak et al. | |
| 9,286,003 B1 | 3/2016 | Hallak et al. | |
| 9,606,870 B1 | 3/2017 | Meiri et al. | |
| 9,716,754 B2 | 7/2017 | Swift | |
| 9,817,606 B1* | 11/2017 | Byrne | G06F 3/067 |
| 10,650,026 B2* | 5/2020 | Rank | G06F 16/275 |
| 2008/0279462 A1 | 11/2008 | Celi, Jr. | |
| 2009/0132955 A1 | 5/2009 | Garg et al. | |
| 2010/0179941 A1 | 7/2010 | Agrawal et al. | |
| 2013/0325824 A1 | 12/2013 | Shoens | |
| 2014/0047263 A1* | 2/2014 | Coatney | G06F 11/20 714/4.11 |
| 2014/0181016 A1 | 6/2014 | Whitehead et al. | |
| 2016/0150012 A1 | 5/2016 | Barszczak et al. | |
| 2016/0202927 A1 | 7/2016 | Klarakis et al. | |
| 2016/0224259 A1 | 8/2016 | Ahrens et al. | |
| 2017/0185306 A1* | 6/2017 | Eisler | G06F 11/2082 |
| 2017/0318089 A1* | 11/2017 | Pandit | G06F 11/2071 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

Itzikr, "DellEMC XtremIO X2/X1 Management, Part 1, The CAS Architecture = Simplicity?," https://xtremio.me/2017/05/08/dellemc-xtremio-x2x1-management-part-1-the-cas-architecture-simplicity/, May 8, 2017, 6 pages.

EMC Corporation, "High Availability, Data Protection and Data Integrity in the XtremIO Architecture," White Paper, Apr. 2015, 28 pages.

Itzikr, "DellEMC XtremIO X2 Tech Preview #2—Native Replication," https://xtremio.me/2017/05/09/dellemc-xtremio-x2-tech-preview-2-native-replication/, May 9, 2017, 8 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

U.S. Appl. No. 15/662,708 filed in the name of Xianping Chen et al. on Jul. 28, 2017 and entitled "Token-Based Data Flow Control in a Clustered Storage System."

U.S. Appl. No. 15/662,809 filed in the name of William Strange et al. on Jul. 28, 2017 and entitled "Automatic Verification of Asynchronously Replicated Data."

U.S. Appl. No. 15/662,833 filed in the name of William Strange et al. on Jul. 28, 2017 and entitled "Signature Generator for Use in Comparing Sets of Data in a Content Addressable Storage System."

U.S. Appl. No. 15/793,121 filed in the name of David Meiri et al. on Oct. 25, 2017 and entitled "Opportunistic Compression of Replicated Data in a Content Addressable Storage System."

U.S. Appl. No. 15/793,147 filed in the name of Ernesto Blanco et al. on Oct. 25, 2017 and entitled "Compression Signaling for Replication Process in a Content Addressable Storage System."

U.S. Appl. No. 15/872,553 filed in the name of Svetlana Kronrod et al. on Jan. 16, 2018 and entitled "Storage System with Consistent Termination of Data Replication Across Multiple Distributed Processing Modules."

U.S. Appl. No. 15/824,536 filed in the name of Christopher Sayles et al. on Nov. 28, 2017 and entitled "Storage System with Asynchronous Messaging Between Processing Modules for Data Replication."

U.S. Appl. No. 15/819,666 filed in the name of Xiangping Chen et al. on Nov. 21, 2017 and entitled "Storage System Configured for Controlled Transition Between Asynchronous and Synchronous Replication Modes."

U.S. Appl. No. 15/876,433 filed in the name of Xiangping Chen et al. on Jan. 22, 2018 and entitled "Storage System with Consistent Initiation of Data Replication Across Multiple Distributed Processing Modules."

* cited by examiner

STORAGE SYSTEM WITH FAST RECOVERY AND RESUMPTION OF PREVIOUSLY-TERMINATED SYNCHRONOUS REPLICATION

FIELD

The field relates generally to information processing systems, and more particularly to storage in information processing systems.

BACKGROUND

Many information processing systems are configured to replicate data from a storage system at one site to a storage system at another site. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Source site and target site storage systems can therefore each be configured to support both asynchronous and synchronous replication modes.

Conventional approaches to data replication can be problematic under certain conditions. For example, in performing synchronous replication in a source site storage system having a distributed storage controller, different data path modules of the distributed storage controller may be mirroring different host writes to the target site storage system in parallel with one another. Such a situation can be problematic in the presence of a replication failure on at least one of the data paths, in that it is unduly difficult to coordinate disabling of synchronous replication functionality across the different data path modules in a manner that preserves target replica consistency without undermining system performance. In addition, it can be unduly difficult to resume previously-terminated synchronous replication without first performing a time-consuming full data re-synchronization.

SUMMARY

Illustrative embodiments provide techniques for fast recovery and resumption of previously-terminated synchronous replication in an information processing system. The "termination" of the synchronous replication as that term is broadly used herein can include, for example, ending synchronous replication data transfer from a source site storage system to a target site storage system, but may additionally or alternatively encompass a wide variety of other situations involving at least one of stopping, suspending, aborting or otherwise interrupting the synchronous replication.

Such embodiments can advantageously provide highly efficient recovery and resumption of a synchronous replication process in the presence of one or more replication failure conditions in a manner that automatically maintains target replica consistency in the presence of potentially dependent mirrored host writes. The need for a time-consuming full data re-synchronization is advantageously avoided. Moreover, such advantages are provided without adversely impacting system performance.

These embodiments illustratively include a clustered implementation of a content addressable storage system having a distributed storage controller. Similar advantages can be provided in other types of storage systems.

In one embodiment, an apparatus comprises a first storage system that includes a plurality of storage devices and a storage controller. The first storage system is configured to participate in a replication process with a second storage system. The replication process is performed under the control of the storage controller. The first storage system is also configured to detect a condition requiring termination of a synchronous replication mode of the replication process, and responsive to the detected condition, to capture a snapshot of source data that is subject to replication from the first storage system to the second storage system as part of the replication process. The first storage system is further configured to terminate the synchronous replication mode of the replication process, to initiate an asynchronous replication mode of the replication process, to execute an asynchronous-to-synchronous transition cycle scan operation for the replication process utilizing the captured snapshot, and to resume the synchronous replication mode of the replication process responsive to successful completion of the asynchronous-to-synchronous transition cycle scan operation.

The detected condition may comprise a replication failure condition for a given write request, such as a failure to receive in the first storage system a response from the second storage system indicating that the given write request has been successfully mirrored from the first storage system to the second storage system in the synchronous replication mode. Such a replication failure condition may arise, for example, due to failure of a communication link between the first and second storage systems.

In some embodiments, capturing a snapshot of source data that is subject to replication from the first storage system to the second storage system as part of the replication process comprises generating at least one snapshot set for a designated source production consistency group. For example, the snapshot set may comprise synchronous replication metadata for the designated source production consistency group and/or volume mapping data for the designated source production consistency group. The source production consistency group may comprise, for example, one or more logical storage volumes of the first storage system, also referred to herein as production data volumes.

The first storage system may be further configured to set a fast_sync_recovery flag or other type of flag responsive to successful capture of the snapshot of source data and to execute the asynchronous-to-synchronous transition cycle scan operation for the replication process responsive to the flag being set.

The first and second storage systems illustratively comprise respective content addressable storage systems having respective sets of non-volatile memory storage devices. For example, the storage devices of the first and second storage systems in such embodiments can be configured to collectively provide respective all-flash storage arrays. The first and second storage systems may be associated with respective source and target sites of the replication process. For example, the source site may comprise a production site data center and the target site may comprise a disaster recovery site data center. Numerous other storage system arrangements are possible in other embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
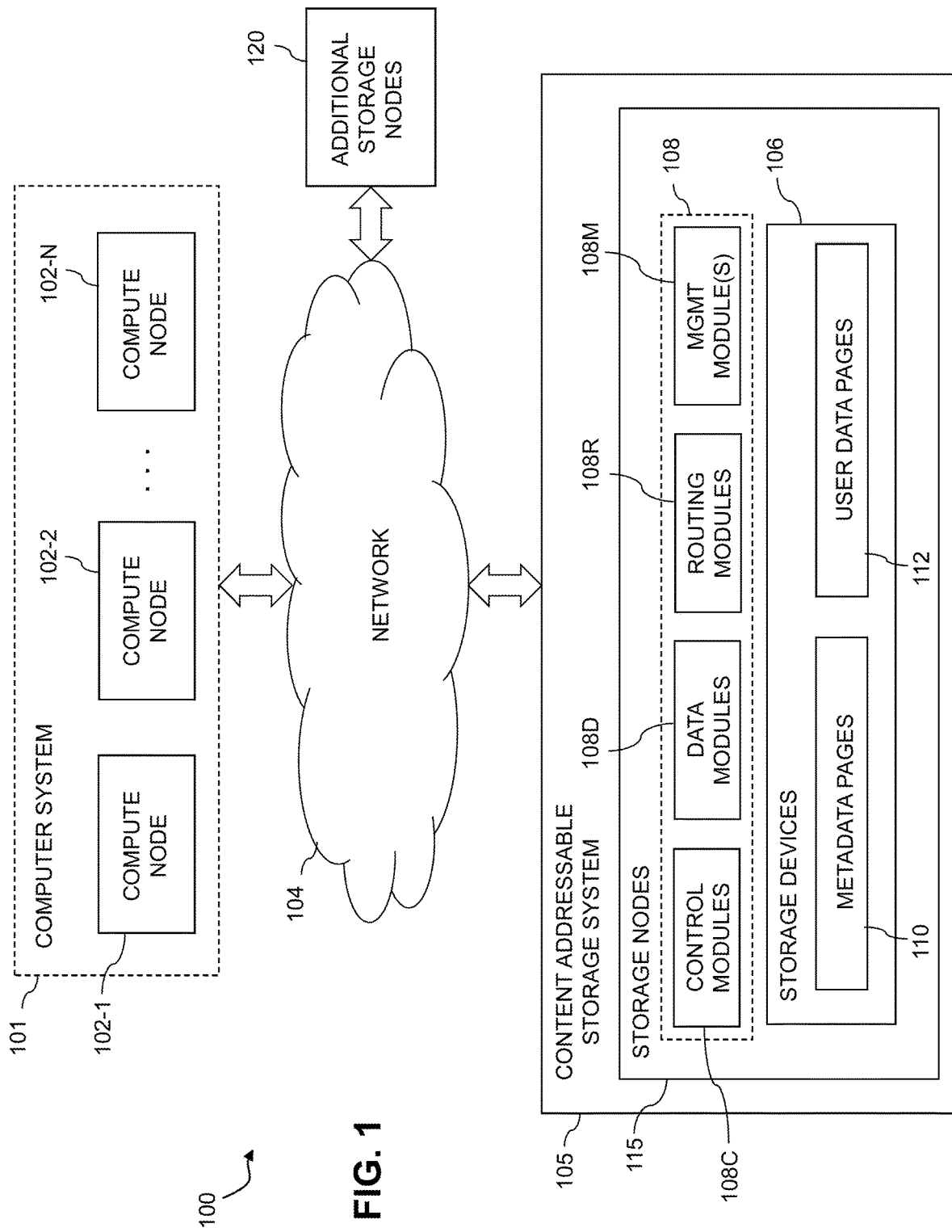
FIG. 1 is a block diagram of an information processing system comprising a content addressable storage system configured with functionality for fast recovery and resumption of previously-terminated synchronous replication in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 may be viewed as examples of what are more generally referred to herein as "host devices" or simply "hosts." Such host devices are configured to write data to and read data from the content addressable storage system 105. The compute nodes 102 and the content addressable storage system 105 may be implemented on a common processing platform, or on separate processing platforms. A wide variety of other types of host devices can be used in other embodiments.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106 and an associated storage controller 108. The storage devices 106 are configured to store metadata pages 110 and user data pages 112, and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data, each also generally referred to herein as a "data item," on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. Such content-based digests are examples of what are more generally referred to herein as "content-based signatures" of the respective user data pages 112. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used.

Figure 2:
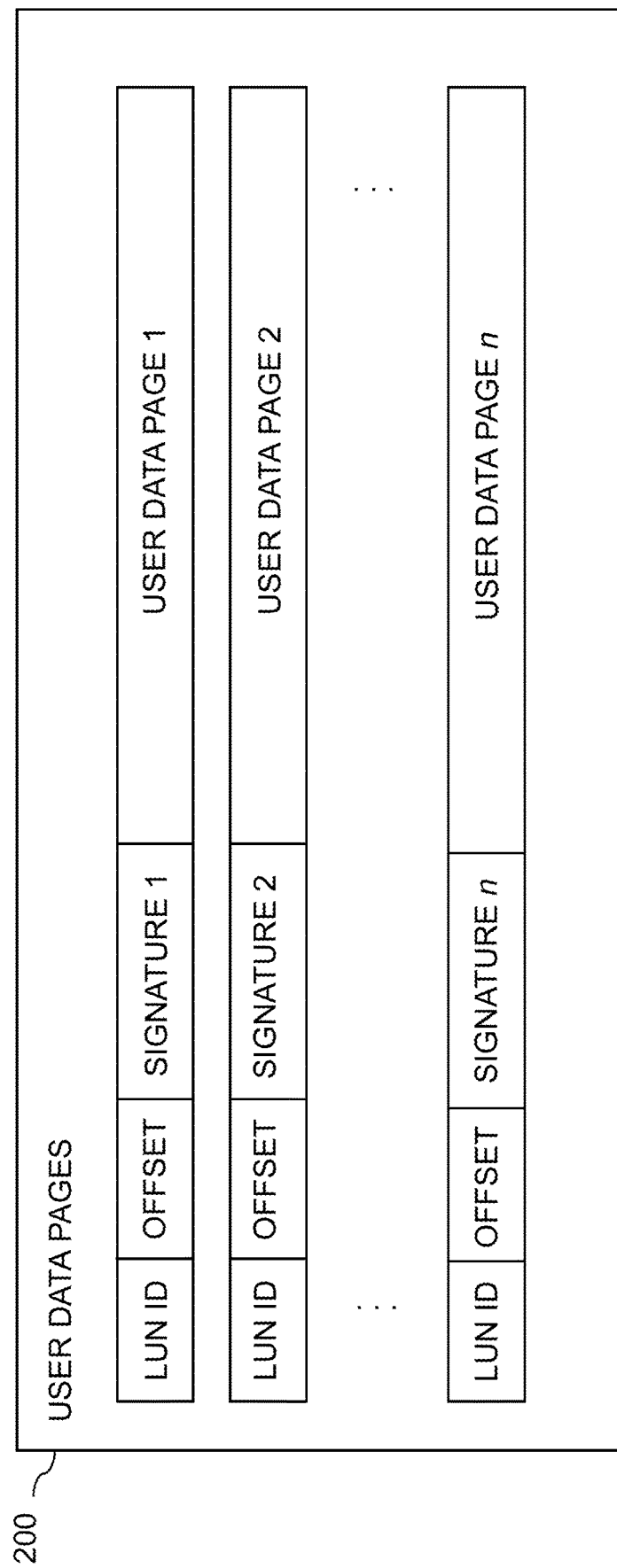
FIG. 2 shows an example of a set of user data pages in an illustrative embodiment.

Each of the metadata pages 110 characterizes a plurality of the user data pages 112. For example, as illustrated in FIG. 2, a given set of user data pages 200 representing a portion of the user data pages 112 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

Figure 3:
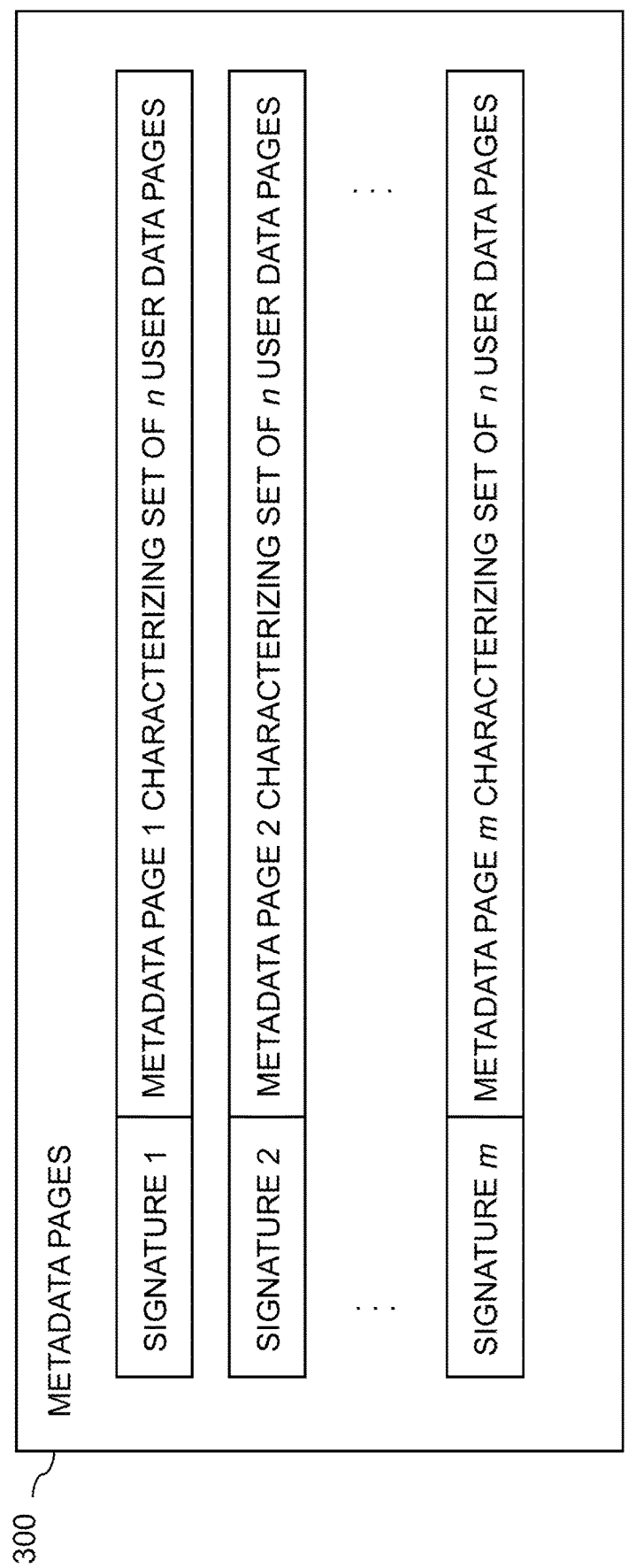
FIG. 3 shows an example of a set of metadata pages in an illustrative embodiment.

This is illustrated in FIG. 3, which shows a given set of metadata pages 300 representing a portion of the metadata pages 110 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The distributed storage controller 108 in the present embodiment is configured to implement functionality for one or more replication processes carried out between the content addressable storage system 105 and another storage system. The term "replication process" as used herein is intended to be broadly construed, so as to encompass a single replication process that includes separate asynchronous and synchronous replication modes, as well as a replication process that includes multiple separate asynchronous and synchronous replication processes. In an arrangement of the latter type, the asynchronous and synchronous replication processes are also considered examples of what are more generally referred to herein as respective asynchronous and synchronous "replication modes." A given replication process as that term is generally used herein can in some cases include either a synchronous replication mode or an asynchronous replication mode, and no other replication modes.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Communication links are established between the various processing modules of the distributed storage controller 108 using well-known communication protocols such as Transmission Control Protocol (TCP) and Internet Protocol (IP). For example, respective sets of IP links used in replication data transfer could be associated with respective different ones of the routing modules 108R and each such set of IP links could include a different bandwidth configuration.

Ownership of a user data logical address space within the content addressable storage system 105 is illustratively distributed among the control modules 108C. The management module 108M may include a replication engine or other arrangement of replication control logic that engages corresponding replication control logic instances in all of the control modules 108C and routing modules 108R in order to implement a data replication process within the system 100, as will be described in more detail below in conjunction with FIG. 4. The data replication process illustratively involves replicating data from one portion of a storage system to another portion of that system, or from one storage system to another storage system. It is desirable in these and other data replication contexts to implement fast recovery and resumption of previously-terminated synchronous replication across multiple distributed processing modules, such as the control modules 108C of the distributed storage controller 108. As indicated previously, the "termination" of synchronous replication as that term is broadly used herein can include, for example, ending synchronous replication data transfer from a source site storage system to a target site storage system, but may additionally or alternatively encompass a wide variety of other situations involving at least one of stopping, suspending, aborting or otherwise interrupting the synchronous replication.

Also, the phrase "fast recovery and resumption" as used herein is intended to be broadly construed to encompass a recovery and resumption of synchronous replication that takes substantially less time than a conventional full data re-synchronization between source and target storage systems. The recovery and resumption is therefore fast relative to the time that would be expended for full data re-synchronization.

In some embodiments, the content addressable storage system 105 comprises an XtremIO™ storage array suitably modified to incorporate techniques for fast recovery and resumption of previously-terminated synchronous replication as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, functionality for fast recovery and resumption of previously-terminated synchronous replication in some embodiments is implemented under the control of at least one system-wide management module of the distributed storage controller 108.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module and D-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

The content addressable storage system 105 in the FIG. 1 embodiment is assumed to be configured to participate in a replication process with a second storage system that is not explicitly shown in the figure. The content addressable storage system 105 is an example of what is referred to herein as a "first storage system" relative to the second storage system. In certain description below, the content addressable storage system 105 will therefore be referred to as the first storage system. Each of the first and second storage systems comprises a plurality of storage devices, such as flash-based storage devices.

The replication process illustratively includes both synchronous and asynchronous replication modes. The synchronous replication mode involves mirroring host writes from the first storage system to the second storage system, while the asynchronous replication mode utilizes cycle-based asynchronous replication. Other types of synchronous and asynchronous replication modes and processes can be used in other embodiments.

More particularly, in this embodiment, the storage controller of the first storage system comprises replication control logic configured to cooperatively interact with corresponding replication control logic in a storage controller of the second storage system in order to execute a replication process carried out between the first and second storage systems. The second storage system can be implemented on the same processing platform as the first storage system or on a different processing platform. The replication control logic of a given one of the first and second storage systems may comprise software, hardware or firmware, or combinations thereof, implemented in one or more storage node processing modules, such as control modules, data modules, routing modules and management modules of a distributed storage controller of the corresponding storage system.

The first and second storage system in this embodiment are further assumed to be implemented as respective clustered storage systems each having a plurality of storage nodes implementing a distributed storage controller such as distributed storage controller 108 of content addressable storage system 105.

Each of the storage nodes of the first storage system comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of a distributed storage controller of the first storage system, such as the distributed storage controller 108. The storage nodes of the second storage system are assumed to be configured in a similar manner.

It is assumed that the first storage system at a given point in time is operating in a synchronous replication mode of the replication process. The first storage system then detects a condition requiring termination of a synchronous replication mode of the replication process. For example, the detected condition may comprise a replication failure condition for a given write request, with the replication failure condition comprising a failure to receive in the first storage system a response from the second storage system indicating that the given write request has been successfully mirrored from the first storage system to the second storage system. Numerous other conditions requiring stopping, suspending, aborting, interrupting or otherwise terminating the synchronous replication mode may be detected.

Responsive to the detected condition, the first storage system captures a snapshot of source data that is subject to replication from the first storage system to the second storage system as part of the replication process. This may more particularly involve generating at least one snapshot set for a designated source production consistency group. The snapshot set illustratively comprises synchronous replication metadata for the designated source production consistency group and/or volume mapping data for the designated source production consistency group. The source production consistency group may comprise, for example, one or more logical storage volumes of the first storage system, also referred to herein as production data volumes.

The first storage system may be configured to set a fast_sync_recovery flag or other type of flag responsive to successful capture of the snapshot of the source data. The first storage system then terminates the synchronous replication mode of the replication process, and initiates an asynchronous replication mode of the replication process.

An asynchronous-to-synchronous transition cycle scan operation for the replication process is executed utilizing the captured snapshot. The asynchronous-to-synchronous transition cycle scan operation is illustratively part of a given one of a plurality of cycles of the asynchronous replication mode of the replication process. For example, the asynchronous-to-synchronous transition cycle scan operation is illustratively part of an asynchronous-to-synchronous transition cycle of the asynchronous replication mode.

The scan operation in some embodiments more particularly comprises comparing the captured snapshot to another snapshot taken by the first storage system in order to generate differential data for transmission to the second storage system within the asynchronous-to-synchronous transition cycle. Such differential data, also referred to herein as a "delta" between a pair of snapshots taken for respective adjacent cycles in the first storage system, is utilized to update a corresponding snapshot at the second storage system as part of the asynchronous replication mode.

The asynchronous-to-synchronous transition cycle scan operation for the replication process may be executed responsive to the fast_sync_recovery flag being set. The synchronous replication mode of the replication process is then resumed responsive to successful completion of the asynchronous-to-synchronous transition cycle scan operation.

The term "write request" as used herein is intended to be broadly construed, so as to encompass one or more input-output (IO) operations directing that at least one data item of a storage system be written to in a particular manner. A given write request is illustratively received in a storage system from a host device. For example, in some embodiments, a write request is received in a distributed storage controller of the storage system, and directed from one processing module to another processing module of the distributed storage controller. More particularly, in the embodiment to be described below in conjunction with FIG. 5B, a received write request is directed from a routing module of a source site storage system to a control module of the source site storage system. Other arrangements for receiving and processing write requests from one or more host devices can be used.

The term "replication acknowledgement" as used herein is also intended to be broadly construed, so as to encompass any type of update, status report or other message that would ordinarily be provided by a processing module of a storage system to a host device responsive to a write request generated by that host device and directed to a data item that is subject to replication in the storage system.

Figure 4:
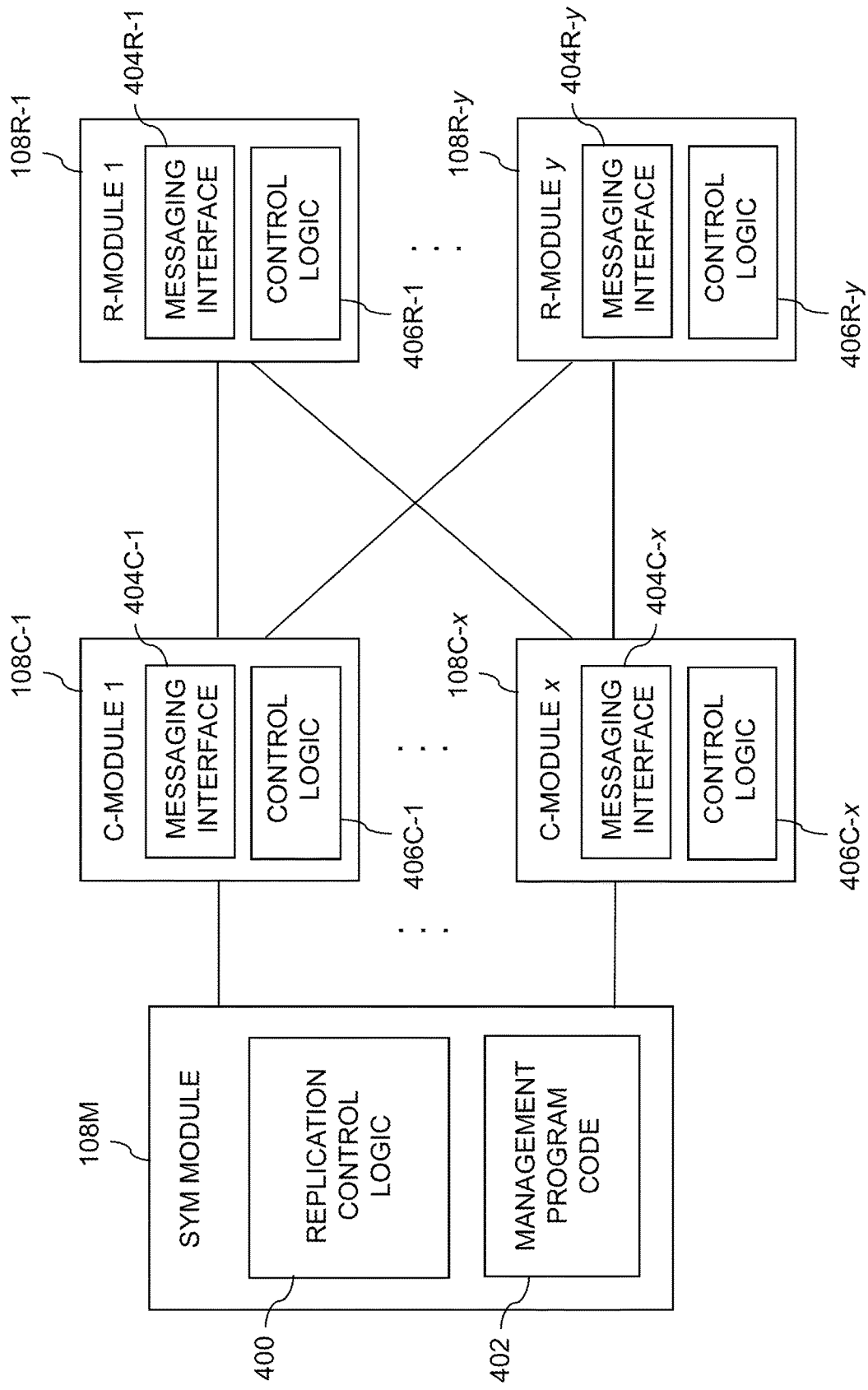
FIG. 4 illustrates a portion of a distributed storage controller of a content addressable storage system showing one possible arrangement supporting fast recovery and resumption of previously-terminated synchronous replication across multiple processing modules of the distributed storage controller.

Referring now to FIG. 4, a more detailed view of a portion of the distributed storage controller 108 in an illustrative embodiment is shown. This embodiment illustrates an example of communications between control modules 108C and routing modules 108R of the distributed storage controller 108.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises replication control logic 400 and associated management program code 402. The management module 108M communicates with control modules 108C-1 through 108C-x, also denoted as C-module 1 through C-module x. The control modules 108C communicate with routing modules 108R-1 through 108R-y, also denoted as R-module 1 through R-module y. The variables x and y are arbitrary integers greater than one, and may but need not be equal. In some embodiments, each of the storage nodes 115 of the content addressable storage system 105 comprises one of the control modules 108C and one of the routing modules 108R, as well as one or more additional modules including one of the data modules 108D.

The control modules 108C-1 through 108C-x in the FIG. 4 embodiment comprise respective messaging interfaces 404C-1 through 404C-x. These messaging interfaces 404C are utilized by corresponding instances of replication control logic 406C-1 through 406C-x to generate, receive and otherwise process messages in conjunction with a replication process. For example, the messaging interfaces 404C are utilized to generate control-to-routing messages for transmission to the routing modules 108R, and to process routing-to-control messages received from the routing modules 108R. The messaging interfaces 404C also generate messages for transmission to the management module 108M and process instructions and other messages received from the management module 108M. The messaging interfaces 404R may also be configured to communicate directly with management module 108M, although such interconnections are not expressly shown in the drawing. For example, all of the modules 108C, 108D, 108R and 108M may be interconnected to communicate over one or more high-speed networks, such as an InfiniBand network.

The replication process is assumed to comprise a synchronous replication process in which write requests directed by one or more host devices to the first storage system are mirrored to the second storage system. It is the synchronous replication process that is initiated, terminated and then subject to fast recovery and resumption in illustrative embodiments. Such a synchronous replication process is also referred to herein as a "synchronous replication mode" of a replication process that includes multiple modes. When a synchronous replication process is enabled for a particular data item or set of data items, the first storage system mirrors host writes to the data item or data items to the second storage system as part of handling those host writes, and only responds to an initiating host after receiving acknowledgement of successful replication from the second storage system.

The replication process can additionally include a cycle-based asynchronous replication process in which the control modules 108C scan differences in designated replication data between replication cycles, and send corresponding data transfer requests as needed to the routing modules 108R. The routing modules 108R in turn replicate the data to a remote storage node cluster of the second storage system, and then respond to the control modules 108C regarding the data replication results.

The routing modules 108R-1 through 108R-y in the FIG. 4 embodiment comprise respective messaging interfaces 404R-1 through 404R-y. These messaging interfaces 404R are utilized by corresponding instances of replication control logic 406R-1 through 406R-y to generate routing-to-control messages for transmission to one or more of the control modules 108C and to process control-to-routing messages received from one or more of the control modules 108C in conjunction with the replication process.

For example, as indicated above, a given one of the control modules 108C may be configured to generate a request message as a control-to-routing message for transmission to a given one of the routing modules 108R requesting that the given routing module transfer designated replication data to the second storage system.

The manner in which a synchronous replication process is implemented in the FIG. 4 embodiment will now be described. It is assumed that a synchronous replication process is currently being carried out by the processing modules 108C, 108D, 108R and 108M. In conjunction with the replication process, a particular one of the control modules 108C detects a replication failure condition for a given write request received from a host device. The host device is illustratively one of the compute nodes 102 of the computer system 101. The particular control module 108C provides a notification of the detected replication failure to the management module 108M.

The synchronous replication process in this embodiment is assumed to be configured such that the second storage system generates for each successfully mirrored write request a corresponding response back to the first storage system. This response generally comes from a routing module of the second storage system back to the particular control module that requested the data transfer for mirroring of the write request. The requesting control module would then normally provide a replication acknowledgement back to the host device that generated the write request, so as to indicate to the host device that the write request has been successfully mirrored to the second storage system.

The detected replication failure condition for the given write request therefore illustratively comprises a failure to receive in the requesting control module a corresponding response from the second storage system indicating that the given write request has been successfully mirrored to the second storage system. For example, the replication failure condition may be detected upon expiration of a specified timeout period without the expected successful mirroring response being received from the second storage system. The timeout period may be measured from transmission of a data transfer request from the requesting control module of the first storage system. Other types of replication failure conditions and failure detection mechanisms can be used in other embodiments.

The notification of the detected replication failure condition may be one of a plurality of such notifications received in the management module 108M from respective different ones of the control modules 108C.

Responsive to receipt of the notification of the detected replication failure condition, the management module 108M instructs all of the control modules 108C to suspend generation of replication acknowledgments for write requests received from the host device. The control modules 108C may each be configured to set a replication barrier responsive to receipt of the instruction from the management module 108M to suspend generation of replication acknowledgments for write requests received from the host device. Such a replication barrier illustratively prevents further replication of additional write requests by the corresponding control module.

It should be noted in this regard that different ones of the control modules 108C may be receiving write requests from different host devices. Multiple host devices may therefore be generating write requests that are subject to replication to the second storage system in a synchronous replication process. Accordingly, references herein to a "host device" should be broadly construed as potentially encompassing one or more host devices.

Each of the control modules 108C sends a confirmation message back to the management module 108M indicating that it has suspended generation of replication acknowledgements to the host device.

Responsive to receipt of the confirmation messages from the control modules 108C, the management module 108M instructs all of the control modules 108C to terminate the replication process. As indicated above, it is assumed for purposes of the present embodiment that the replication process comprises a synchronous replication process. Accordingly, the first storage system may transition from the terminated synchronous replication process back to an asynchronous replication process, or alternatively from a terminated synchronous replication mode to an asynchronous replication mode in a replication process that includes both synchronous and asynchronous modes of operation. The first storage system may subsequently transfer back to the synchronous replication process or mode of operation from the asynchronous replication process or mode of operation.

The management module 108M illustratively instructs all of the control modules 108C of the distributed storage controller 108 to terminate the synchronous replication process only after confirmation of suspended generation of replication acknowledgements is received from each of those control modules. The management module 108M may instruct all of the control modules 108C of the distributed storage controller 108 to terminate the replication process by instructing each of the control modules to stop mirroring write requests to the second storage system. It is possible that different ones of the control modules 108C will stop mirroring write requests to the second storage system at different times.

Figure 7:
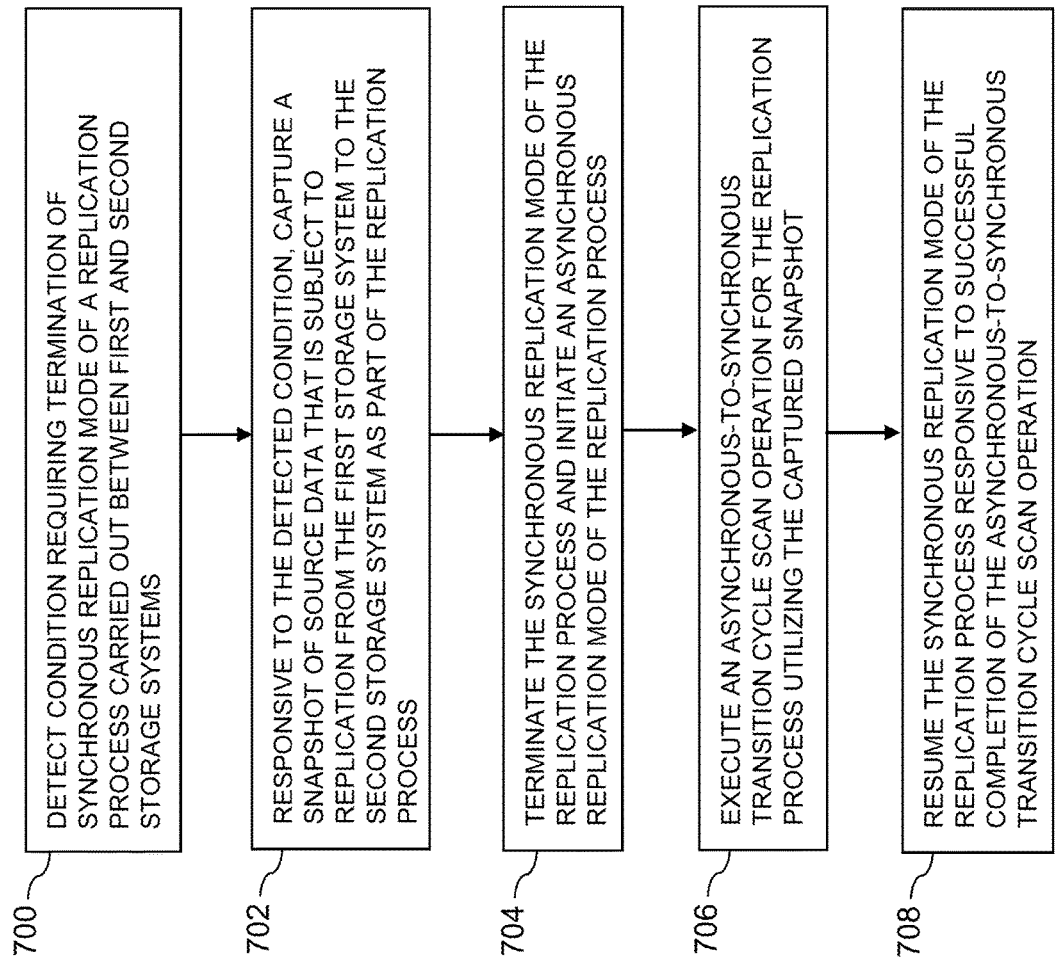
FIG. 7 is a flow diagram of a process for fast recovery and resumption of previously-terminated synchronous replication in an illustrative embodiment.

After the synchronous replication process is terminated, the first storage system performs fast recovery and resumption of the previously-terminated synchronous replication as described above. An example process for fast recovery and resumption of previously-terminated synchronous replication is shown in FIG. 7.

The above-described operations of the given control module and the given routing module are carried out under the control of their respective control logic instances 406C and 406R in cooperation with the replication control logic 400 of the management module 108M. The other control logic instances 406C and 406R in the other control and routing modules 108C and 108R are similarly configured to control message processing in order to implement portions of a replication process as disclosed herein.

As a more particular example in the XtremIO™ context, a process for fast recovery and resumption of previously-terminated synchronous replication is advantageously configured to automatically maintain target replica consistency in the presence of potentially dependent mirrored host writes, while also avoiding the need for a time-consuming full data re-synchronization after synchronous replication termination. Moreover, such advantages are provided without adversely impacting system performance.

The C-modules, D-modules and R-modules of the storage nodes in this context are assumed to be configured to communicate with one another over a high-speed internal network such as an InfiniBand network. The C-modules, D-modules and R-modules coordinate with one another to accomplish various IO processing tasks.

Communications between the modules may be subject to synchronous messaging timeout periods configured to ensure that host IO operations will not time out even if module failure recovery is needed in the distributed storage controller.

Additionally or alternatively, asynchronous messaging techniques may be used, such as those disclosed in U.S. patent application Ser. No. 15/824,536, filed Nov. 28, 2017 and entitled "Storage System with Asynchronous Messaging between Processing Modules for Data Replication," which is incorporated by reference herein. These asynchronous messaging techniques can avoid problems that could otherwise result if network issues cause data transfer between the source and target site storage systems to take a relatively long time. For example, undesirable timeouts in the replication data transfer messages exchanged between the C-modules and the R-modules can be more readily avoided.

It is assumed for purposes of the present example that data transfer request messages can be sent from any C-module to any R-module in the storage node cluster of the corresponding storage system. A given data transfer request message sent from a C-module to an R-module will receive an immediate response within a synchronous messaging timeout period. The response will usually be successful and the received data transfer request message will be processed by the R-module using a background thread. An error will be returned if there is something wrong with the message or if the R-module cannot process the message. Data transfer result responses will be sent back from the R-module to the C-module as separate messages.

The functionality for fast recovery and resumption of previously-terminated synchronous replication in this particular example is more specifically implemented in the manner described below. This embodiment generally involves capturing the replication context before terminating synchronous replication, and utilizing the captured replication context for fast recovery and resumption of terminated synchronous replication.

In cycle-based asynchronous replication, data to be replicated from source to target is typically in the form of read-only snapshots. All data content from a source snapshot is copied to a target snapshot, and it is known that the two snapshots contain the same data at the end of each replication cycle if replication is successful. A given pair of source and target snapshot sets ("snapsets") for which data content has been successfully replicated from source to target are referred to as synchronized snapshot sets. In synchronous replication, the data to be replicated from the source to the target is typically from production data volumes that change constantly, such that synchronized snapshot sets cannot be created without pausing IO operations for the production data volumes. However, pausing IO operations is not practical in many storage environments. The fast recovery and resumption of synchronous replication disclosed herein minimizes such pausing of IO operations while also avoiding the need for a full data re-synchronization in order to create synchronized snapshot sets.

The example process for fast recovery and resumption of previously-terminated synchronous replication in the present embodiment is as follows.

The process initially performs the following operations at the source storage system:

1. Detect a condition requiring that synchronous replication be stopped, suspended, aborted, interrupted or otherwise terminated.

2. Create a checkpoint snapshot set against a source production consistency group to save the data and metadata that are known to have already been successfully transferred to the target storage system.

3. Perform a two-phase algorithm for consistent termination of synchronous replication, as described in more detail below.

4. Set and persist a fast_sync_recovery flag to indicate that fast recovery and resumption of synchronous replication is possible (e.g., if the above-noted checkpoint snapshot set is created successfully).

5. Transition the replication process to an asynchronous replication mode.

In this portion of the process, a given C-module 108C-1 detects a replication failure condition. As a result of the detected replication failure condition, the C-module 108C-1 gives up on mirroring the corresponding host write to the target storage system. The C-module 108C-1 therefore holds the host write without acknowledging it to the host. This is to prevent the host from sending subsequent write requests that may have dependence on the failed write.

The given C-module 108C-1 then notifies the SYM module 108M that synchronous replication should be disabled. Several different C-modules 108C may notify the SYM module 108M independently and substantially simultaneously.

Upon receiving the notification from the given C-module 108C-1 that synchronous replication should be disabled, the SYM module 108M orchestrates the creation of the checkpoint snapshot set against the source production consistency group in step 2 above, and then orchestrates the two-phase algorithm for consistent termination of synchronous replication in step 3 above. This two-phase algorithm is illustratively implemented as follows:

Phase I: The SYM module 108M instructs all C-modules 108C to suspend generation of write request replication acknowledgements to the host. Upon receiving this instruction message from the SYM module 108M, each of the C-modules 108C sets a corresponding synchronous replication barrier. From this point on, all host writes will be waiting on the synchronous replication barriers of the respective C-modules 108C and therefore will not be acknowledged to the host. This guarantees target consistency when there is a time lag in switching of replication mode between the multiple distributed C-modules 108C as part of Phase II of the two-phase algorithm. After receiving responses from all of the C-modules 108C indicating that Phase I is complete, the SYM module 108M moves to Phase II.

Phase II: The SYM module 108M instructs all C-modules 108C to stop mirroring writes to the target, thereby effectively disabling the synchronous replication mode in all data path modules. Upon receiving this instruction message from the SYM module 108M, each of the C-modules 108C disables synchronous replication mode. In addition, each of the C-modules 108C releases the synchronous replication barrier it had previously set in Phase I, and so resumes processing of host writes and other IO operations. Also, the original host write that was held in the given C-module 108C-1 when the consistent termination procedure was triggered by detection of a replication failure condition is finally acknowledged to the host.

The above two-phase algorithm guarantees a write-consistent target replica upon synchronous replication mode termination in the distributed C-modules 108C, with each such C-module performing actual mirroring termination on its own time. Setting of the synchronous replication barriers as part of Phase I of the two-phase algorithm allows the consistent termination procedure to be implemented in a way that avoids any adverse performance impact on the normal operation of the system.

Additional details regarding techniques for consistent termination of a synchronous replication mode suitable for use in illustrative embodiments are disclosed in U.S. patent application Ser. No. 15/872,553, filed Jan. 16, 2018 and entitled "Storage System with Consistent Termination of Data Replication Across Multiple Distributed Processing Modules," now U.S. Pat. No. 10,338,851, which is incorporated by reference herein.

The process for fast recovery and resume of synchronous replication then performs the following operations at the source storage system:

1. In the asynchronous replication mode, if the fast_sync_recovery flag is set, update the base cycle snapshot set to point to the checkpoint snapshot set created right before consistent termination of synchronous replication.

2. Notify the target storage system to prepare for fast recovery and resumption of synchronous replication.

If it is determined in this portion of the process that the fast_sync_recovery flag is not set, the process may initiate a full data re-synchronization.

The process finally performs the following operations in order to prepare for fast recovery and resumption of synchronous replication at the target storage system:

1. If there is existing asynchronous-to-synchronous transition cycle snapshot set created from a previous asynchronous-to-synchronous transition cycle, that snapshot set may be "cleaned up," for example, by deleting it.

2. Create a new asynchronous-to-synchronous transition cycle snapshot set against the target production consistency group to preserve data prior to recovery.

3. Notify the data modules to prepare for receiving synchronous replication writes from the source storage system.

After both source and target have completed the above-noted preparations for fast recovery and resumption of synchronous replication, the source can start the asynchronous-to-synchronous transition cycle data transfer, and start synchronous replication data mirroring to target. Once the asynchronous-to-synchronous transition cycle is complete, the source and target consistency groups are back in a synchronous state.

This approach takes advantage of the fact that volume metadata is typically updated only after successful synchronous replication data transfer to the target, and that the snapshot set created by the source right before the consistent termination of synchronous replication will include only data that has been successfully transferred to the target. Thus, during recovery, the process transfers just the differential data ("delta") between production data and the snapshot set captured prior to consistent termination in order to recover any data transfer that may be been missed as a result of the termination.

The source site portions of the example process described above are executed utilizing replication control logic instances 400, 406C and 406R of the respective storage node processing modules 108M, 108C and 108R of the first storage system.

It is to be appreciated that the particular process operations described above are exemplary only, and can be varied in other embodiments.

Also, the particular interconnection and signaling arrangements illustrated for processing modules 108C, 108R and 108M in FIG. 4 are presented by way of example only, and can be varied in other embodiments.

In some embodiments, the replication control logic of these processing modules comprises at least a portion of a replication engine of the storage controller 108. An example of such a replication engine and its associated processing operations will be described in more detail below in conjunction with the embodiment of FIG. 6.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for fast recovery and resumption of previously-terminated synchronous replication in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, content addressable storage system 105, storage devices 106, storage controller 108 and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with functionality for fast recovery and resumption of previously-terminated synchronous replication across multiple processing modules can be offered to cloud infrastructure customers or other users as a PaaS offering.

Additional details of illustrative embodiments will now be described with reference to FIGS. 5, 6 and 7. FIGS. 5 and 6 illustrate examples of information processing systems that each include a first content addressable storage system such as content addressable storage system 105 of the FIG. 1 embodiment that is configured to participate in a replication process with another storage system over at least one network.

In the context of the FIG. 5 embodiment, the storage systems participating in the replication process are assumed to be associated with respective source and target sites of the replication process. For example, the source site may comprise a production site data center and the target site may comprise a disaster recovery site data center. The FIG. 6 embodiment more generally refers to the storage systems participating in the replication process as respective first and second storage systems. The first and second storage systems illustratively comprise respective content addressable storage systems having respective sets of non-volatile memory storage devices, although other types of storage systems can be used.

Figure 5A:
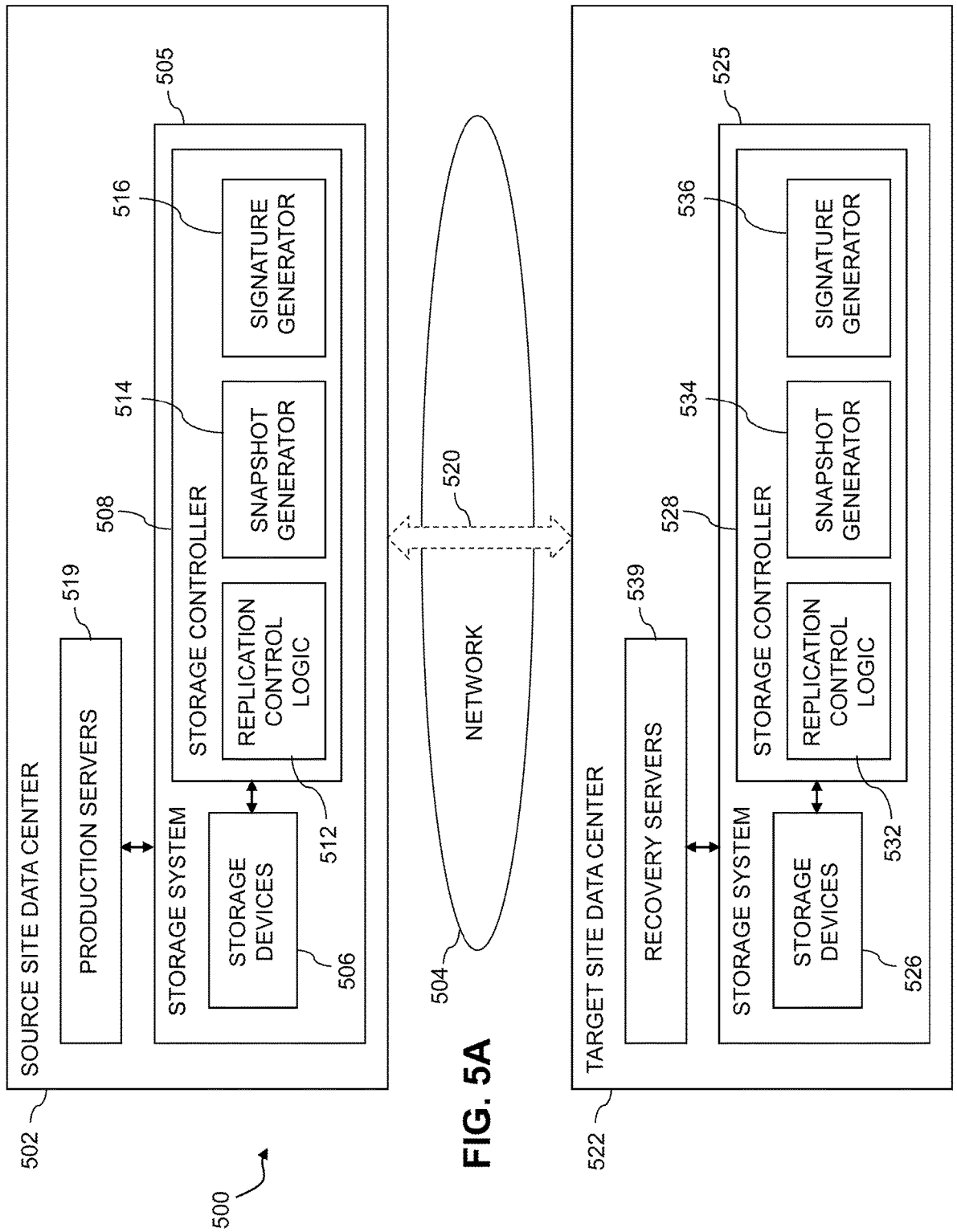
FIGS. 5A and 5B are block diagrams showing different views of an information processing system comprising source site and target site storage systems configured to participate in a replication process in an illustrative embodiment. These two figures are collectively referred to herein as FIG. 5.
Figure 5B:
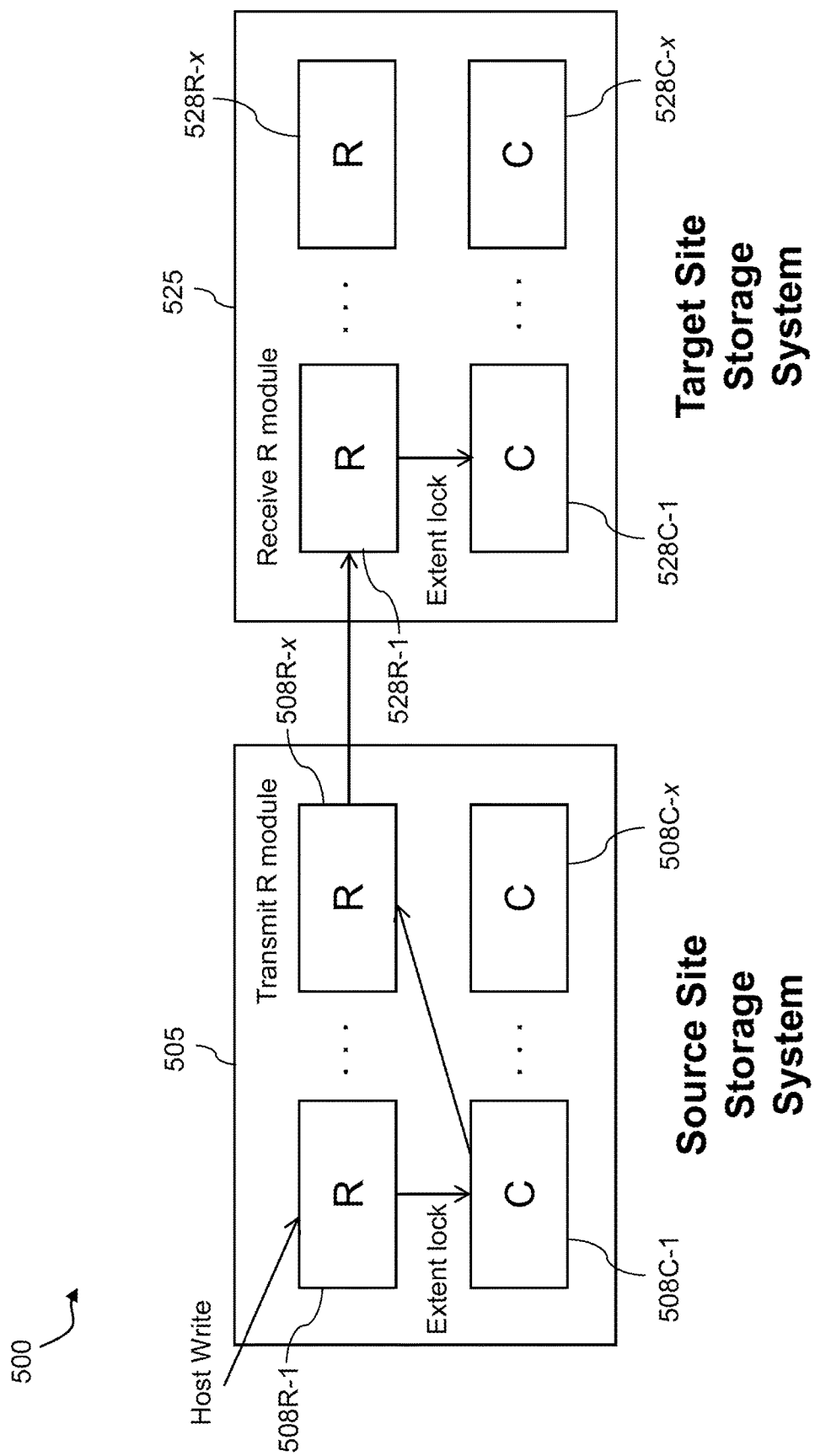
Figure 6:
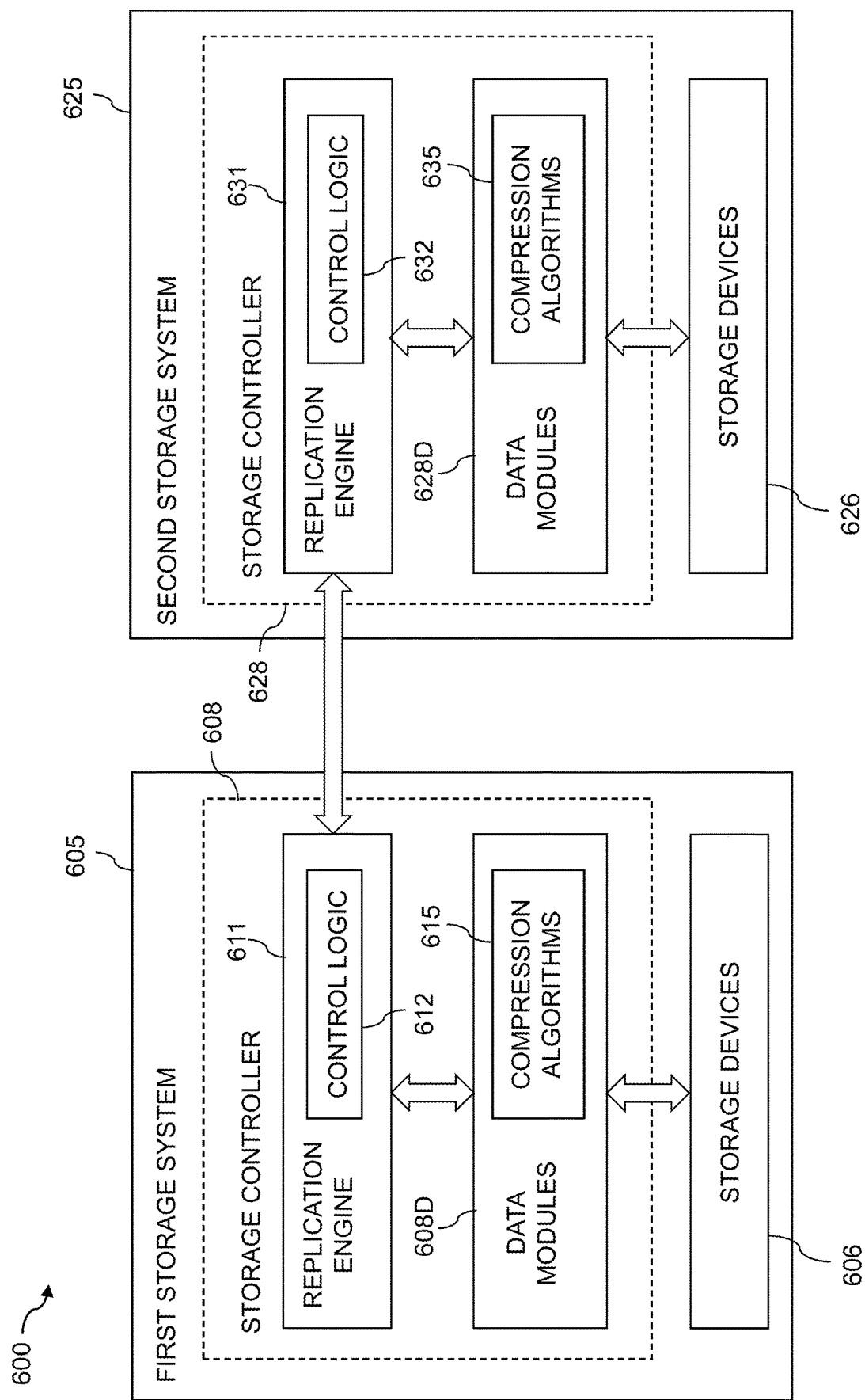
FIG. 6 illustrates interaction between replication engines implemented in respective storage controllers of respective first and second storage systems as part of a replication process in an illustrative embodiment.

As mentioned previously, FIG. 5 more particularly comprises two separate figures denoted FIG. 5A and FIG. 5B, each showing different views of respective portions of an information processing system.

Referring now to FIG. 5A, an information processing system 500 in an illustrative embodiment comprises a source site data center 502 coupled to at least one network 504. The source site data center 502 comprises a storage system 505 having storage devices 506 and an associated storage controller 508. The storage controller 508 comprises replication control logic 512, snapshot generator 514 and signature generator 516. The source site data center 502 further comprises a set of production servers 519 coupled to the storage system 505.

As indicated above, the storage system 505 in the present embodiment is assumed to comprise a content addressable storage system, although other types of storage systems can be used in other embodiments.

The source site data center 502 is coupled via one or more communication channels 520 of the network 504 to a target site data center 522 of the system 500. The target site data center 522 comprises a storage system 525. The storage system 525 comprises storage devices 526 and an associated storage controller 528. The storage controller 528 comprises replication control logic 532, snapshot generator 534 and signature generator 536.

The target site data center 522 further comprises a set of recovery servers 539 coupled to the storage system 525. The storage system 525, like the storage system 505, is assumed to comprise a content addressable storage system, although again other types of storage systems can be used in other embodiments.

The source site data center 502 and the target site data center 522 are examples of what are more generally referred to herein as respective ones of a "source site" and a "target site" of an information processing system. The source site data center 502 and the target site data center 522 will therefore also be referred to herein as respective source site 502 and target site 522 of the system 500. In some embodiments, the target site 522 comprises a disaster recovery site data center and the source site 502 comprises a production site data center, although other arrangements are possible.

The source site 502 and target site 522 may be implemented in respective distinct local and remote geographic locations, although it is also possible for the two sites to be within a common facility or even implemented on a common processing platform.

It is assumed that data is replicated in system 500 from the source site 502 to the target site 522 using a replication process that begins in an asynchronous replication mode, and subsequently transitions from the asynchronous replication mode to a synchronous replication mode. For example, the asynchronous replication mode may be used to replicate the bulk of a given set of data from the first storage system to the second storage system. The mirroring functionality of the synchronous replication mode is then enabled. Other arrangements utilizing different replication modes and different transitions between the modes are possible.

The synchronous replication mode in some embodiments is illustratively configured to mirror data writes between the first and second storage systems. For example, when a host device writes data to the first storage system, the first storage system responds to the host device with an acknowledgement of successful storage in the first storage system only after the first storage system sends the data to the second storage system and receives an acknowledgement of successful storage back from the second storage system.

The asynchronous replication mode in some embodiments implements cycle-based asynchronous replication to periodically transfer data in multiple cycles from the source site 502 to the target site 522. The data replicated from the source site 502 to the target site 522 can include all of the data stored in the storage system 505, or only certain designated subsets of the data stored in the storage system 505. Different replication processes of different types can be implemented for different parts of the stored data.

A given "replication process" as that term is broadly used herein may include both asynchronous and synchronous replication modes as well as support for concurrent operation of such modes and separate operation of the individual modes. The term "mode" as used herein in conjunction with asynchronous or synchronous replication may therefore itself comprise a corresponding asynchronous or synchronous replication process.

An exemplary cycle-based asynchronous replication process will now be described in more detail. The production servers 519 at the source site 502 illustratively run applications for users of the system 500. These servers are configured to store application data in the storage system 505. This application data is illustratively part of the data stored in storage system 505 that is replicated from the source site 502 to the target site 522. The recovery servers 539 at the target site 522 are configured to take up the running of the applications for the users of the system 500 in the event of a disaster recovery or other recovery situation. The applications on the recovery servers 539 of the target site 522 are started using the data that has been replicated to the target site 522 in the cycle-based asynchronous replication process.

The production servers 519 and recovery servers 539 of the respective source site 502 and target site 522 illustratively comprise respective processing devices of one or more processing platforms of the corresponding source site 502 or target site 522. For example, these servers can comprise respective VMs each having a processor and a memory, although numerous other configurations are possible. At least portions of the source site 502 and target site 522 can be implemented in cloud infrastructure such as an AWS system or another cloud-based system such as GCP or Microsoft Azure.

The storage systems 505 and 525 of the source and target sites 502 and 522 may be configured for automatic verification of asynchronously replicated data over multiple cycles of a cycle-based asynchronous replication process. This illustratively involves asynchronously replicating data from the storage devices 506 of the storage system 505 to the storage devices 526 of the storage system 525 and automatically verifying the correctness of portions of the replicated data in over multiple cycles. Other types of verification of correct replication can be used in other embodiments.

As noted above, the storage systems 505 and 525 of the source and target sites 502 and 522 may comprise respective content addressable storage systems having respective sets of non-volatile memory storage devices.

Additionally or alternatively, the storage systems 505 and 525 of the source and target sites 502 and 522 may comprise respective clustered storage systems having respective sets of storage nodes each having a plurality of storage devices.

In some embodiments, the storage systems 505 and 525 illustratively comprise scale-out all-flash storage arrays such as XtremIO™ storage arrays from Dell EMC of Hopkinton, Mass. Other types of storage arrays, including by way of example Unity™, VNX® and Symmetrix VMAX® storage arrays also from Dell EMC, can be used to implement storage systems in other embodiments. A given such storage array can be configured to provide storage redundancy using well-known RAID techniques such as RAID 5 or RAID 6, although other storage redundancy configurations can be used.

The term "storage system" as used herein is therefore intended to be broadly construed, and should not be viewed as being limited to content addressable storage systems or flash-based storage systems.

The storage devices 506 and 526 of respective storage systems 505 and 525 illustratively implement a plurality of LUNs configured to store files, blocks, objects or other arrangements of data.

In the present embodiment, the storage system 525 of the target site 522 is configured to participate in a cycle-based asynchronous replication process with the storage system 505 of the source site 502. This cycle-based asynchronous replication process is illustratively implemented in system 500 by cooperative interaction of the storage systems 505 and 525 over network 504 using their respective replication control logic 512 and 532, snapshot generators 514 and 534, and signature generators 516 and 536. Examples of cycles of an illustrative cycle-based asynchronous replication process of this type will be described in more detail below.

The storage system 525 of the target site 522 is more particularly configured in this embodiment to receive from the storage system 505 of the source site 502, in respective ones of a plurality of cycles of the cycle-based asynchronous replication process, corresponding sets of differential data representing respective deltas between pairs of source site snapshots for respective pairs of the cycles. The source site snapshots are generated by the snapshot generator 514 of the storage controller 508.

The storage system 525 of the target site 522 illustratively utilizes the sets of differential data received in the respective ones of the cycles to update respective target site snapshots for those cycles. The target site snapshots are generated by the snapshot generator 534 of the storage controller 528.

In some embodiments, over multiple ones of the cycles, the storage system 525 of the target site 522 generates target site signatures for respective different portions of a designated one of the updated target site snapshots. The target site signatures are generated by the signature generator 536 of the storage controller 528. The storage system 525 also receives from the storage system 505 of the source site 502 corresponding source site signatures for respective different portions of a designated one of the source site snapshots. The source site signatures are generated by the signature generator 516 of the storage controller 508. The storage system 525 compares the target site and source site signatures over the multiple cycles in order to verify that the designated target site and source site snapshots are equivalent. Again, other types of signature-based verification can be used in other embodiments. For example, signature-based verification can be performed for full source and target snapshots within each cycle, rather than for portions of such snapshots over multiple cycles.

Further details regarding asynchronous replication processes suitable for use in illustrative embodiments herein can be found in U.S. patent application Ser. No. 15/662,809, filed Jul. 28, 2017 and entitled "Automatic Verification of Asynchronously Replicated Data," now U.S. Pat. No. 10,437,855, which is incorporated by reference herein. Other embodiments need not utilize these automatic verification techniques, and can be implemented using alternative verification techniques as well as other types of replication processes. Accordingly, illustrative embodiments herein are not limited to use with cycle-based asynchronous replication, but are more generally applicable to other types of data replication.

The particular exemplary cycle-based asynchronous replication processes described above can be varied in other embodiments. Alternative synchronous replication processes may also be used. As mentioned previously, such processes are performed in respective asynchronous and synchronous replication modes of a replication process that incorporates both asynchronous and synchronous replication.

Each of the source site 502 and target site 522 in the FIG. 5A embodiment is assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, the storage controllers 508 and 528 or various components thereof can each be implemented in the form of one or more LXCs running on one or more VMs. Other arrangements of one or more processing devices of a processing platform can be used to implement the storage controllers 508 and 528 and/or their respective components. Other portions of the system 500 can similarly be implemented using one or more processing devices of at least one processing platform.

The source site 502 and target site 522 are illustratively implemented on respective distinct processing platforms, although numerous other arrangements are possible. For example, in some embodiments at least portions of the source site 502 and the target site 522 may be implemented on the same processing platform. The term "processing platform" as used herein is intended to be broadly construed so as to encompass, by way of illustration and without limitation, multiple sets of processing devices and associated storage systems that are configured to communicate over one or more networks.

Referring now to FIG. 5B, a more detailed view of a portion of the information processing system 500 is shown, including processing modules of distributed storage controllers of the source site storage system 505 and the target site storage system 525.

As illustrated, a portion of a distributed storage controller of the source site storage system 505 comprises a plurality of control modules 508C-1 through 508C-x and a plurality of routing modules 508R-1 through 508R-x. The distributed storage controller of the storage system 505 is assumed to further comprise a plurality of data modules and at least one management module, although these additional processing modules are not shown in the figure for clarity and simplicity of illustration.

Similarly, a portion of a distributed storage controller of the target site storage system 525 comprises a plurality of control modules 528C-1 through 528C-x and a plurality of routing modules 528R-1 through 528R-x. The distributed storage controller of the storage system 525 is also assumed to further comprise a plurality of data modules and at least one management module, although these additional processing modules are not shown in the figure.

Also illustrated in FIG. 5B is a portion of a messaging flow associated with a particular host write that is to be replicated from the source site storage system 505 ("source") to the target site storage system 525 ("target") as part of a synchronous replication process or synchronous replication mode of the system 500.

The synchronous replication process flow for the given host write in this embodiment illustratively comprises the following steps:

1. Host write
2. Extent lock at source
3. Write at source
4. Transmit to target
5. Receive in target
6. Extent lock at target
7. Write at target
8. Release extent lock at target
9. Return status to source
10. Update A2H locally at source
11. Release extent lock at source
12. Return status to host In the figure, steps 1, 2 and 4-6 are illustrated by arrows. The extent lock refers to locking of a particular address range in conjunction with the host write. The A2H updated in step 10 is an address-to-hash ("A2H") table that provides a mapping between logical addresses and corresponding content-based signatures of respective data pages. As the host write illustratively changes content of one or more such data pages, the content-based signatures and associated A2H table are updated in conjunction with the host write.

An example of a replication failure condition in this embodiment is a failure of the transmitting control module 508C-1 to receive an expected response from the target site storage system 525 as part of the status report in step 9 above indicating that the given host write has been successfully mirrored to the target site storage system 525. Upon detection of such a replication failure condition, the control module 508C-1 provides a notification to a management module of the source site storage system 505.

The management module then controls the consistent termination of the synchronous replication process in the manner previously described, through communication with all of the control modules 508C. This causes the control module 508C-1 to suspend generation of replication acknowledgements back to the host device that generated the host write. Accordingly, the control module 508C-1 will not return status to the host in step 12 of the above synchronous replication messaging flow, although it may subsequently acknowledge the host write back to the host device after or otherwise in conjunction with the termination of the synchronous replication process.

One or more messages associated with returning status back to the host in step 12 of the synchronous replication messaging flow may therefore be viewed as an example of what is more generally referred to herein as a "replication acknowledgement."

The other control modules 508C will operate in a similar manner to that described above for control module 508C-1, as instructed by the management module.

Again, it is to be appreciated that these and other features of illustrative embodiments are presented by way of example only, and should not be construed as limiting in any way. Accordingly, different numbers, types and arrangements of system components such as source and target sites 502 and 522 and their respective storage systems 505 and 525 and storage controllers 508 and 528 can be used in other embodiments. In these other embodiments, only subsets of these components, or additional or alternative sets of components, may be used, and such components may exhibit alternative functionality and configurations.

The replication process carried out between the source site storage system 505 and the target site storage system 525 in the FIG. 5 embodiment utilizes techniques for fast recovery and resumption of consistent termination techniques of the type previously described in conjunction with the content addressable storage system 105 of FIG. 1. Examples of such arrangements will now be described in further detail with reference to FIGS. 6 and 7.

Turning now to FIG. 6, an information processing system 600 comprises a first storage system 605 comprising storage devices 606 and a distributed storage controller 608. The distributed storage controller 608 comprises a plurality of data modules 608D and a replication engine 611 having control logic 612. The data modules 608D implement compression algorithms 615 for compressing data in conjunction with storage of the data in the storage devices 606. The replication engine 611 and its associated control logic 612 may be implemented at least in part in one or more control modules and/or management modules of the distributed storage controller 608, although such modules are not explicitly shown in the figure. The distributed storage controller 608 may be viewed as corresponding to an instance of storage controller 108 of FIG. 1 or storage controller 508 or 528 of FIG. 5.

The information processing system 600 further comprises a second storage system 625 comprising storage devices 626 and a distributed storage controller 628. The distributed storage controller 628 comprises a plurality of data modules 628D and a replication engine 631 having control logic 632. The data modules 628D implement compression algorithms 635 for compressing data in conjunction with storage of the data in the storage devices 626. The replication engine 631 and its associated control logic 632 may be implemented at least in part in one or more control modules and/or management modules of the distributed storage controller 628, although such modules are not explicitly shown in the figure. The distributed storage controller 628 may be viewed as corresponding to an instance of storage controller 108 of FIG. 1 or storage controller 508 or 528 of FIG. 5.

The compression algorithms 615 and 635 can include any of a number of well-known algorithms utilized to compress data in storage systems. Such algorithms are therefore not described in detail herein.

In the FIG. 6 embodiment, the first storage system 605 is configured to participate in a replication process with the second storage system 625. The replication process is carried out at least in part by the replication engines 611 and 631 of the respective storage systems 605 and 625 as directed by control logic 612 and 632. Such control logic is an example of what is more generally referred to herein as "replication control logic," although the latter term is intended to be broadly construed and accordingly in some implementations can encompass an entire replication engine such as replication engine 611 or 631. Replication control logic as disclosed herein can be implemented at least in the part in the form of software, possibly in combination with associated hardware and/or firmware.

The data modules 608D of the first storage system 605 are assumed to be configured to implement one or more RAID algorithms that involve compressing data pages in conjunction with storage of the data pages in the storage devices 606 of the first storage system 605. At least a subset of the data modules 608D are each further assumed to comprise one or more caches in which data pages are stored in uncompressed form prior to being compressed for storage in the storage devices 606. The data modules 628D of the second storage system 625 are configured in a similar manner.

As part of the replication process, the replication engine 611 utilizes control logic 612 to request from a given one of the data modules 608D at least one data page to be replicated to the second storage system 625.

For example, replication engine 611 sends a request for one or more data pages, or other type or arrangement of data to be replicated, to the appropriate one of the data modules 608D. The data modules 608D and 628D are referred to as "backend" data modules in this embodiment relative to "frontend" components such as replication engines 611 and 631 that control the replication process.

The operation of the information processing system 600 will now be described in further detail with reference to the flow diagram of the illustrative embodiment of FIG. 7. The process as shown includes steps 700 through 708, and is suitable for use in the system 600 but is more generally applicable to other types of information processing systems, including systems 100 and 500 of respective FIGS. 1 and 5, in which multiple storage systems are configured to participate in a replication process. The steps are illustratively performed by cooperative interaction of replication engines or other arrangements of replication control logic of respective storage controllers in respective source site and target site storage systems, also referred to as respective first and second storage systems. A given such storage controller in a source site or target site storage system can comprise a distributed storage controller implemented in the manner illustrated in FIG. 1, 5 or 6.

In step 700, a condition is detected requiring termination of a synchronous replication mode of a replication process carried out between first and second storage systems. The synchronous replication mode is assumed to be one in which write requests directed by one or more host devices to the first storage system are mirrored to the second storage system. The synchronous replication process may have been initiated responsive to a transition from an asynchronous replication process. For example, the first storage system may initially operate in an asynchronous replication mode and subsequently transition to a synchronous replication mode.

The initiation of the synchronous replication mode in some embodiments can be carried out using consistent initiation techniques disclosed in U.S. patent application Ser. No. 15/876,433, filed Jan. 22, 2018 and entitled "Storage System with Consistent Initiation of Data Replication Across Multiple Distributed Processing Modules," now U.S. Pat. No. 10,324,640, which is incorporated by reference herein.

Any of a wide variety of conditions may require termination of the synchronous replication mode subsequent to its initiation. As mentioned previously, such "termination" is intended to be broadly construed, and conditions requiring termination can therefore include any condition that requires ending synchronous replication data transfer from the first storage system to the second storage system, as well as other conditions involving at least one of stopping, suspending, aborting or otherwise interrupting the synchronous replication.

For example, the detected condition may comprise a replication failure condition for a given write request, such as a failure to receive in the first storage system a response from the second storage system indicating that the given write request has been successfully mirrored from the first storage system to the second storage system in the synchronous replication mode. Such a replication failure condition may arise, for example, due to failure of a communication link between the first and second storage systems.

In step 702, responsive to the detected condition requiring termination of the synchronous replication mode, a snapshot of source data that is subject to replication from the first storage system to the second storage system as part of the replication process is captured. This step in some embodiments more particularly involves generating at least one snapshot set for a designated source production consistency group.

In step 704, the synchronous replication mode of the replication process is terminated and an asynchronous replication mode of the replication process is initiated.

The termination of the synchronous replication mode in some embodiments can be carried out using consistent termination techniques disclosed in the above-cited U.S. patent application Ser. No. 15/872,553, entitled "Storage System with Consistent Termination of Data Replication Across Multiple Distributed Processing Modules." Other types of termination techniques can be used in other embodiments.

In step 706, an asynchronous-to-synchronous transition cycle scan operation is executed for the replication process utilizing the captured snapshot. For example, a flag may be set responsive to successful capture of the snapshot of source data in step 702, and the asynchronous-to-synchronous transition cycle scan operation for the replication process may be executed responsive to the flag being set.

In step 708, the synchronous replication mode of the replication process is resumed responsive to successful completion of the asynchronous-to-synchronous transition cycle scan operation.

Additional transitions between replication modes of a replication process can then be carried out as needed, possibly through iterated performance of respective instances of the FIG. 7 process. The first and second storage systems may therefore be configured to repeatedly transition from asynchronous to synchronous replication, and vice-versa. During at least a portion of such a transition, the first and second storage systems may concurrently operate in both asynchronous and synchronous replication modes, possibly using controlled transition functionality as disclosed in U.S. patent application Ser. No. 15/819,666, filed Nov. 21, 2017 and entitled "Storage System Configured for Controlled Transition Between Asynchronous and Synchronous Replication Modes," now U.S. Pat. No. 10,496,489, which is incorporated by reference herein.

It is also to be appreciated that the FIG. 7 process and other features and functionality for fast recovery and resumption of previously-terminated synchronous replication as described above can be adapted for use with other types of information systems, including by way of example an information processing system in which source site and target site storage systems are both implemented on the same processing platform.

The particular processing operations and other system functionality described in conjunction with the flow diagram of FIG. 7 are presented by way of illustrative example only, and should not be construed as limiting the scope of the disclosure in any way. Alternative embodiments can use other types of processing operations for implementing fast recovery and resumption of previously-terminated synchronous replication. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for fast recovery and resumption of previously-terminated synchronous replication for respective different sets of replicated data or for different storage systems or portions thereof within a given information processing system.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108, 508, 528, 608 or 628 that is configured to control performance of one or more steps of the FIG. 7 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, 508, 528, 608 or 628, as well as other system components, may be implemented at least in part using processing devices of such processing platforms. For example, in a distributed implementation of the storage controller 108, 508, 528, 608 or 628, respective distributed modules of such a storage controller can be implemented in respective LXCs running on respective ones of the processing devices of a processing platform.

In some embodiments, the first and second storage systems comprise respective XtremIO™ storage arrays suitably modified to incorporate techniques for fast recovery and resumption of previously-terminated synchronous replication as disclosed herein. As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement functionality for fast recovery and resumption of previously-terminated synchronous replication using the FIG. 7 process.

The techniques for fast recovery and resumption of previously-terminated synchronous replication implemented in the embodiments described above can be varied in other embodiments. For example, different types of process operations can be used in other embodiments. Furthermore, although described in some embodiments in the context of data replication from a source to a target, the techniques in other embodiments can be implemented in the context of other types of data transfer within a given storage system or from one storage system to another storage system.

In addition, the above-described functionality associated with C-module, D-module, R-module and SYM module components of an XtremIO™ storage array can be incorporated into other processing modules or components of a centralized or distributed storage controller in other types of storage systems.

Illustrative embodiments of content addressable storage systems or other types of storage systems with functionality for fast recovery and resumption of previously-terminated synchronous replication as disclosed herein can provide a number of significant advantages relative to conventional arrangements.

For example, some embodiments can advantageously provide highly efficient recovery and resumption of a synchronous replication process that has been stopped, suspended, aborted, interrupted or otherwise terminated in the presence of one or more replication failure conditions in a manner that automatically maintains target replica consistency in the presence of potentially dependent mirrored host writes.

In these and other embodiments, fast recovery and resumption techniques completely avoid the need for a time-consuming full data re-synchronization process between source and target storage systems.

Such advantages are provided in illustrative embodiments without adversely impacting system performance.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing systems 100, 500 and 600 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage systems 105, 505, 525, 605 and 625, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100, 500 or 600. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments, such as systems 500 and 600.

Figure 8:
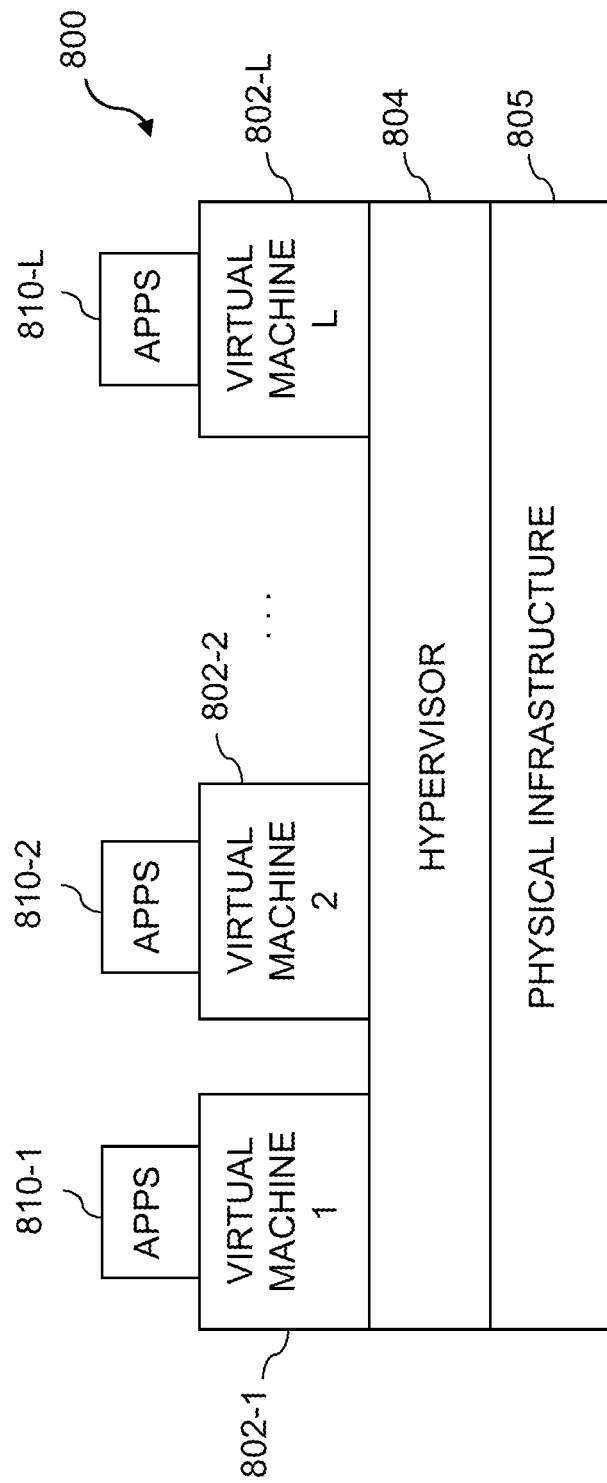
FIGS. 8 and 9 show examples of processing platforms that may be utilized to implement at least a portion of an information processing system in illustrative embodiments.
Figure 9:
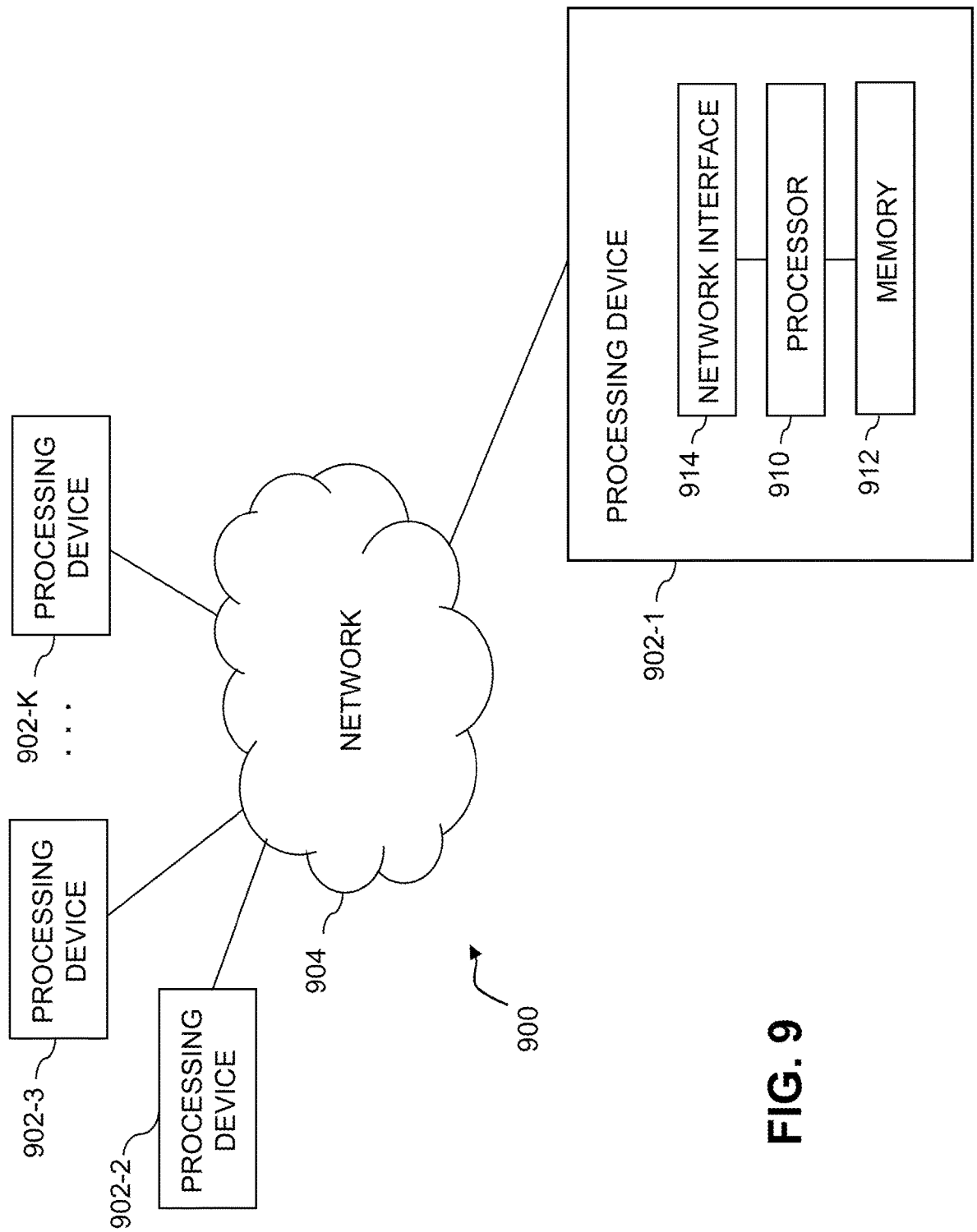

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

Although only a single hypervisor 804 is shown in the embodiment of FIG. 8, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 804 and possibly other portions of the information processing system 100 in one or more embodiments is the VMware® vSphere® which may have an associated virtual infrastructure management system such as the VMware® vCenter™.

The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, ... 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk, an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controllers 108, 508, 528, 608 and 628 of systems 100, 500 and 600 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, source and target sites, storage systems, storage nodes, storage devices, storage controllers, replication processes, replication engines and associated replication control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    a first storage system comprising a plurality of storage devices and a storage controller;
    the first storage system being configured to participate in a replication process with a second storage system, the replication process being performed under the control of the storage controller;
    wherein the first storage system is further configured:
    to detect a condition requiring termination of a synchronous replication mode of the replication process;
    responsive to the detected condition, to capture a snapshot of source data that is subject to replication from the first storage system to the second storage system as part of the replication process;
    to terminate the synchronous replication mode of the replication process;
    to initiate an asynchronous replication mode of the replication process;

to execute an asynchronous-to-synchronous transition cycle scan operation for the replication process utilizing the captured snapshot; and to resume the synchronous replication mode of the replication process responsive to successful completion of the asynchronous-to-synchronous transition cycle scan operation;

wherein the asynchronous-to-synchronous transition cycle scan operation comprises comparing the captured snapshot to another snapshot taken by the first storage system in order to generate differential data for transmission to the second storage system;

wherein capturing a snapshot of source data that is subject to replication from the first storage system to the second storage system as part of the replication process comprises generating at least one snapshot set for a designated source production consistency group before termination of synchronous replication;

wherein the first storage system comprises a plurality of storage nodes each comprising one or more of the storage devices and wherein each of the storage nodes of the first storage system further comprises a set of processing modules configured to communicate over one or more networks with corresponding sets of processing modules on other ones of the storage nodes, the sets of processing modules of the storage nodes of the first storage system collectively comprising at least a portion of the storage controller of the first storage system;

wherein each of the sets of processing modules comprises one or more control modules, one or more routing modules and one or more data modules, and wherein at least one of the sets of processing modules comprises a management module;

wherein the management module instructs all of the control modules of the storage controller to terminate the synchronous replication mode only after confirmation of suspended generation of replication acknowledgements for host device write requests is received from each of those control modules responsive to respective corresponding instructions from the management module to suspend generation of such replication acknowledgements; and wherein the first storage system is implemented using at least one processing device comprising a processor coupled to a memory.

2. The apparatus of claim 1 wherein the first and second storage systems comprise respective content addressable storage systems having respective sets of non-volatile memory storage devices.

3. The apparatus of claim 1 wherein the first and second storage systems are associated with respective source and target sites of the replication process and wherein the source site comprises a production site data center and the target site comprises a disaster recovery site data center.

4. The apparatus of claim 1 wherein the management module comprises a system-wide management module of the first storage system.

5. The apparatus of claim 1 wherein the management module instructs all of the control modules of the storage controller to terminate the synchronous replication mode by instructing each of the control modules to stop mirroring write requests to the second storage system.

6. The apparatus of claim 1 wherein the snapshot set comprises synchronous replication metadata for the designated source production consistency group.

7. The apparatus of claim 1 wherein the snapshot set comprises volume mapping data for the designated source production consistency group.

8. The apparatus of claim 1 wherein the asynchronous-to-synchronous transition cycle scan operation is part of a given one of a plurality of cycles of the asynchronous replication mode of the replication process.

9. The apparatus of claim 1 wherein the first storage system is further configured to set a flag responsive to successful capture of the snapshot of source data and to execute the asynchronous-to-synchronous transition cycle scan operation for the replication process responsive to the flag being set.

10. A method comprising:

detecting a condition requiring termination of a synchronous replication mode of a replication process carried out between a first storage system and a second storage system, the first storage system comprising a plurality of storage devices and a storage controller;

responsive to the detected condition, capturing a snapshot of source data that is subject to replication from the first storage system to the second storage system as part of the replication process;

terminating the synchronous replication mode of the replication process;

initiating an asynchronous replication mode of the replication process;

executing an asynchronous-to-synchronous transition cycle scan operation for the replication process utilizing the captured snapshot; and resuming the synchronous replication mode of the replication process responsive to successful completion of the asynchronous-to-synchronous transition cycle scan operation;

wherein the asynchronous-to-synchronous transition cycle scan operation comprises comparing the captured snapshot to another snapshot taken by the first storage system in order to generate differential data for transmission to the second storage system;

wherein capturing a snapshot of source data that is subject to replication from the first storage system to the second storage system as part of the replication process comprises generating at least one snapshot set for a designated source production consistency group before termination of synchronous replication;

wherein the first storage system comprises a plurality of storage nodes each comprising one or more of the storage devices and wherein each of the storage nodes of the first storage system further comprises a set of processing modules configured to communicate over one or more networks with corresponding sets of processing modules on other ones of the storage nodes, the sets of processing modules of the storage nodes of the first storage system collectively comprising at least a portion of the storage controller of the first storage system;

wherein each of the sets of processing modules comprises one or more control modules, one or more routing modules and one or more data modules, and wherein at least one of the sets of processing modules comprises a management module;

wherein the management module instructs all of the control modules of the storage controller to terminate the synchronous replication mode only after confirmation of suspended generation of replication acknowledgements for host device write requests is received from each of those control modules responsive to respective corresponding instructions from the management module to suspend generation of such replication acknowledgements; and wherein the method is implemented by at least one processing device comprising a processor coupled to a memory.

11. The method of claim 10 wherein a flag is set responsive to successful capture of the snapshot of source data and the asynchronous-to-synchronous transition cycle scan operation for the replication process is executed responsive to the flag being set.

12. A computer program product comprising a non-transitory processor-readable storage medium having stored therein program code of one or more software programs, wherein the program code when executed by at least one processing device of a first storage system comprising a plurality of storage devices and a storage controller causes the first storage system:

to detect a condition requiring termination of a synchronous replication mode of a replication process carried out between the first storage system and a second storage system;

responsive to the detected condition, to capture a snapshot of source data that is subject to replication from the first storage system to the second storage system as part of the replication process;

to terminate the synchronous replication mode of the replication process;

to initiate an asynchronous replication mode of the replication process;

to execute an asynchronous-to-synchronous transition cycle scan operation for the replication process utilizing the captured snapshot; and to resume the synchronous replication mode of the replication process responsive to successful completion of the asynchronous-to-synchronous transition cycle scan operation;

wherein the asynchronous-to-synchronous transition cycle scan operation comprises comparing the captured snapshot to another snapshot taken by the first storage system in order to generate differential data for transmission to the second storage system;

wherein capturing a snapshot of source data that is subject to replication from the first storage system to the second storage system as part of the replication process comprises generating at least one snapshot set for a designated source production consistency group before termination of synchronous replication;

wherein the first storage system comprises a plurality of storage nodes each comprising one or more of the storage devices and wherein each of the storage nodes of the first storage system further comprises a set of processing modules configured to communicate over one or more networks with corresponding sets of processing modules on other ones of the storage nodes, the sets of processing modules of the storage nodes of the first storage system collectively comprising at least a portion of the storage controller of the first storage system;

wherein each of the sets of processing modules comprises one or more control modules, one or more routing modules and one or more data modules, and wherein at least one of the sets of processing modules comprises a management module; and wherein the management module instructs all of the control modules of the storage controller to terminate the synchronous replication mode only after confirmation of suspended generation of replication acknowledgements for host device write requests is received from each of those control modules responsive to respective corresponding instructions from the management module to suspend generation of such replication acknowledgements.

13. The computer program product of claim 12 wherein a flag is set responsive to successful capture of the snapshot of source data and the asynchronous-to-synchronous transition cycle scan operation for the replication process is executed responsive to the flag being set.

14. The computer program product of claim 12 wherein the asynchronous-to-synchronous transition cycle scan operation is part of a given one of a plurality of cycles of the asynchronous replication mode of the replication process.

15. The computer program product of claim 12 wherein the detected condition comprises a replication failure condition for a given write request, the replication failure condition comprising a failure to receive in the first storage system a response from the second storage system indicating that the given write request has been successfully mirrored from the first storage system to the second storage system, and further wherein in conjunction with termination of the synchronous replication mode, generation of replication acknowledgements to one or more host devices is suspended for write requests received from the one or more host devices.

16. The method of claim 10 wherein the detected condition comprises a replication failure condition for a given write request, the replication failure condition comprising a failure to receive in the first storage system a response from the second storage system indicating that the given write request has been successfully mirrored from the first storage system to the second storage system, and further wherein in conjunction with termination of the synchronous replication mode, generation of replication acknowledgements to one or more host devices is suspended for write requests received from the one or more host devices.

17. The apparatus of claim 1 wherein the detected condition comprises a replication failure condition for a given write request, the replication failure condition comprising a failure to receive in the first storage system a response from the second storage system indicating that the given write request has been successfully mirrored from the first storage system to the second storage system, and further wherein in conjunction with termination of the synchronous replication mode, generation of replication acknowledgements to one or more host devices is suspended for write requests received from the one or more host devices.

18. The method of claim 10 wherein the snapshot set comprises synchronous replication metadata for the designated source production consistency group.

19. The method of claim 10 wherein the snapshot set comprises volume mapping data for the designated source production consistency group.

20. The method of claim 10 wherein the asynchronous-to-synchronous transition cycle scan operation is part of a given one of a plurality of cycles of the asynchronous replication mode of the replication process.

* * * * *